(12) United States Patent
Herz et al.

(10) Patent No.: US 8,285,619 B2
(45) Date of Patent: Oct. 9, 2012

(54) STOCK MARKET PREDICTION USING NATURAL LANGUAGE PROCESSING

(75) Inventors: Frederick S. M. Herz, Warrington, PA (US); Lyle H. Ungar, Philadelphia, PA (US); Jason M. Eisner, Baltimore, MD (US); Walter Paul Labys, Ogden, UT (US)

(73) Assignee: Fred Herz Patents, LLC, Milton, WV (US)

( * ) Notice: Subject to any disclaimer, the term of this patent is extended or adjusted under 35 U.S.C. 154(b) by 2280 days.

(21) Appl. No.: 10/054,057

(22) Filed: Jan. 22, 2002

(65) Prior Publication Data
US 2003/0135445 A1    Jul. 17, 2003

Related U.S. Application Data

(60) Provisional application No. 60/263,556, filed on Jan. 22, 2001.

(51) Int. Cl.
*G06Q 40/00* (2006.01)
(52) U.S. Cl. ..................... 705/36 R
(58) Field of Classification Search ............... 705/35–40
See application file for complete search history.

(56) References Cited

U.S. PATENT DOCUMENTS 6,308,172 B1 * 10/2001 Agrawal et al. .................. 707/5
2002/0059126 A1 * 5/2002 Ricciardi ....................... 705/36

OTHER PUBLICATIONS

Daily stock market forecast from textual web data. Wuthrich, B.;Cho, V.;Leung, S; Permunetilleke, D; Sankaran, K.; Zhang, J., SMC'98 Conference Proceedings. 1998 IEEE International Conference on Systems, Man and Cybernetics, p. 2720-5, vol. 3, New York, NY.*
Wuthrich et al., "Daily stock market forecast from textual web data", SMC 98 Conference Proceedings, 1998 IEEE.*
Intelligent agents. Roesler, Marina; Hawkins, Donald T. ONLINE. Jul. 1994, 18, 4, p. 18.*

\* cited by examiner

*Primary Examiner* — Olabode Akintola
(74) *Attorney, Agent, or Firm* — Woodcock Washburn LLP

(57) ABSTRACT

A method of using natural language processing (NLP) techniques to extract information from online news feeds and then using the information so extracted to predict changes in stock prices or volatilities. These predictions can be used to make profitable trading strategies. Company names can be recognized and simple templates describing company actions can be automatically filled using parsing or pattern matching on words in or near the sentence containing the company name. These templates can be clustered into groups which are statistically correlated with changes in the stock prices. The system is composed of two parts: message understanding component that automatically fills in simple templates and a statistical correlation component that tests the correlation of these patterns to increases or decreases in the stock price. The methods can be applied to a broad range of text, including articles in online newspapers such as the Wall Street Journal, financial newsletters, radio &TV transcripts and annual reports. In an enhanced embodiment of the system statistical patterns in Internet usage data and Internet data such as newly released textual information on Web pages are further leveraged.

7 Claims, 3 Drawing Sheets

```
Template Filling 1. read news article
2. parse
3. recognize proper names; standardize them
4. determine co-reference (optional)
5. fill in template
6. augment template using databases
   and derived values
```

FIGURE 1

```
Figure 1: Template Filling 1. read news article
2. parse
3. recognize proper names; standardize them
4. determine co-reference (optional)
5. fill in template
6. augment template using databases
   and derived values
```

FIGURE 2

Figure 2: Building the Stock Predictor 1. cluster templates into similar groups
2. look up changes in stock price
   at appropriate delays from announcement
3. estimate the probability of change being
   predicted by the template;
   check statistical significance

FIGURE 3

| |
|---|
| Figure 3: Using the Stock Predictor |
| 0. build predictor per figures 1 and 2
1. read online news story
2. fill template per method in figure 1
3. predict probabilty of stock price of volatility changing by looking up average changes for the template in the past
4. trade (long or short) based on prediction |

STOCK MARKET PREDICTION USING NATURAL LANGUAGE PROCESSING

CROSS-REFERENCE TO RELATED APPLICATIONS

The present application claims priority to U.S. Provisional Patent Application Ser. No. 60/263,556, filed Jan. 22, 2001, the contents of which are incorporated herein by reference.

FIELD OF THE INVENTION

The field of the invention relates to financial trading systems and more particularly the analysis of dynamically changing information sources such as on-line news feeds (using natural language processing), and user trading behavior in order to predict changes in stock price or volatilities.

BACKGROUND OF THE INVENTION

In the present field of art, stock market trading systems are based upon a variety of automated methods, formulas and algorithms with which to predict the dynamics and trends in market behavior. However, prior art stock trading systems fail to recognize the value of automating stock trading decisions based upon statistical correlations which are historically proven to exist between certain company events, actions and metrics (which are extracted through natural language processing via associated templates and changes and dynamics in stock prices). The present invention uses such correlations to develop a stock market prediction model.

SUMMARY OF THE INVENTION

A method of using natural language processing (NLP) techniques to extract information from online news feeds and then using the information so extracted to predict changes in stock prices or volatilities is provided. These predictions can be used to make profitable trading strategies. More specifically, company names can be recognized and simple templates describing company actions can be automatically filled using parsing or pattern matching on words in or near the sentence containing the company name. These templates can be clustered into groups which are statistically correlated with changes in the stock prices.

BRIEF DESCRIPTION OF THE DRAWINGS

FIG. 1 illustrates a sequence of actions for template filling in accordance with the invention.

FIG. 2 illustrates a sequence of actions for building a stock predictor in accordance with the invention.

FIG. 3 illustrates a sequence of actions for using the stock predictor of the invention to predict the movement in a stock and to act on that prediction.

DETAILED DESCRIPTION OF THE INVENTION

The system of the invention is composed of two parts: a message understanding component that automatically fills in simple templates such as:
COMPANY-NAME: _____
ACTION: _____
CHANGE: _____
in ITEM: _____
where each of the capitalized words can take on many values (e.g. COMPANY NAME: IBM, Microsoft, Apple or . . . CHANGE: increase, decrease, or "no change", ITEM: expenses, prices, sales, employees . . . ANNOUNCED: announced, reported . . . ), and a statistical correlation component that tests the correlation of these patterns to increases or decreases in the stock price.

The methods described below can be applied to a broad range of text, including articles in online newspapers such as the Wall Street Journal, financial newsletters, radio & TV transcripts and annual reports. The inventors envision it being used first for newswires such as Bloomberg, or perhaps the AP Newswire. In an enhanced embodiment of the system the inventors further leverage statistical patterns in Internet usage data and Internet data such as newly released textual information on Web pages.

Template Filling

For filling in the templates, standard techniques can be used such as those presented in the Message Understanding Competitions (See e.g. the MUC-6 Proceedings). The basic idea is to use specialized "named entity recognizers" to determine which words refer to companies, places and people, and to standardize these (i.e., to recognize that "IBM", "I.B.M.", and "International Business Machines" all refer to the same company). Groups of equivalent words (e.g., "announced", "reported", "released a report" . . . ) can be initially determined using online thesauruses such as WordNet, and then refined using statistical co-occurrence data (e.g. words that tend to show up in the same environment belong in the same group). Other important word groups include different actions (hiring, firing, buying, selling . . . ) and types and directions of change (increase, decrease, improve, worsen.) More descriptive words such as "breathtaking," "shabby," "askance," "improprieties," "titan," etc., may also prove useful. To the extent that the press influences investors' decisions, one can potentially make use of data on what subjective terms were used, about whom, and in what publication they appeared.

With regards to this last attribute, one could add further attributes, which attempt to account for "impact" upon market awareness. Such attributes may include degree of prominence in the publication (e.g., as to a headline or a back article), whether the release was made before, in what other publication(s), if so what was the market response, how long between publications including the present one (was the release completely new news, was it a follow up article to a continuing story, or was the news event previously suggested in a previous article as a potential future event or not). Or alternatively, was the event part of a developing or unfolding story (i.e., which the market had already been aware of the most significant event(s) which led up to the present one) and is it likely that the new event could have been at least somewhat anticipated as a potential future event based upon the present status of pre-existing releases on the subject. If the publication was released at least twice before, what was the difference in relative change in price following each sequential release (also distribution/readership is considered as part of the identity of the publication).

Each news release is used to fill one or more standardized templates. The templates will each include one or more companies whose stocks are publicly traded (e.g. as the company making the announcement or the company being acquired). For concreteness consider the following example:

ORIGINAL NEWSWIRE (Apr. 14, 1997 10:14)

XYZ company announced that profits were off by 15% and that 20 employees would be laid off.

TEMPLATES FILLED:

```
COMPANY: XYZ
ITEM: profit
RELATIVE_CHANGE: −15%
COMPANY: XYZ
ITEM: employees
ABSOLUTE_CHANGE: −20
```

A number of different attributes are important. A given article will often give only one attribute and one has to determine others either by a calculation from other information in the article, or by lookup in a database. Consider "CHANGE". In addition to the qualitative direction of change, one may know either absolute change or percent change. Percent change may be more significant than absolute change particularly since the significance of absolute change is often subject to the original quantitative number.

Profiles can be augmented from a database such as those maintained by Dow Jones or Lexis/Nexis, so that as soon one knows COMPANY-NAME: MBI, one is able to fill in additional attributes such as STOCK VOLATILITY (BETA): 0.62, or associative attributes indicating how much revenue the company derives from various markets, the company's share of each of these markets, the number of R &D dollars spent in each, etc. Likewise, if one company is thinking of buying another, one should fill in attributes such as relative size.

The following template illustrates some of the above points.

```
COMPANY-NAME: MBI                      read
ACTION: announced                      read
CHANGE: decreases                      read
PERCENT_CHANGE: −10%                             derived
ABSOLUTE_CHANGE: −$375,000                       read
in ITEM: first quarter 1997 profits read
STOCK VOLATILITY: 0.62                           looked up
SALES (1996): 620,000,000              looked up
PROFITS (Q1, 1997): $3,750,000         looked up
SIC_CODE: 1367                                   looked up
```

Standard NLP techniques for determining sentence structure will be used to determine the relationships between different entities (e.g., which company is doing the buying and which is doing the selling or being sold).

In filling the templates it is important to use co-reference chains for determining what phrases like "he" and "the company" refer to, e.g., "BMI held a major briefing. They announced that profits were off by $375,000".

The above sequence of actions is summarized in FIG. 1.

Using Templates to Predict Stock Prices

Given the templates, standard statistical techniques can be used to determine which announcements drive stock prices up or down. This requires several nontrivial "tricks". The basic idea is to start with a rough estimate of how long the change should occur after the press release and then to look for stock price changes at that time. The inventors expect most announcements to affect the market almost instantly, but one must account for the fluctuations in stock price.

When trying to explain which announcements were responsible for a given change (e.g. IBM's $2 fall), one should factor out effects that applied more broadly to high-tech companies (or blue-chip companies, or the market as a whole), whether one has explanations for those broader effects or not. Predictions are for changes in stock price relative to the appropriate index. As will be explained below, this can be used in the trading strategy. Nonetheless, the present techniques may use cluster to template features as presently described to predict stock movement patterns of a particular company as they relate statistically (historically), with that particular stock as well as clustering of the companies themselves as they tend to share or not share similar stock movement patterns in response to similar news information released. A more comprehensive approach to feature extraction using NLP in addition to the template approach may be useful in this particular model. Text-based and case-based matching techniques using statistical feedback (for weighting of the term attributes) as well as clustering of the articles based upon their lists of readers are useful in determining similarity of present news releases to those previous ones. Co-pending patent application entitled "System for Customized Electronic Identification of Desirable Objects", describes a novel technique for predicting the future price of a stock based upon the trading actions of particular individuals who have successfully anticipated movement patterns of certain stocks through their trading decisions. The "success" of these "experts" across various stocks can be used to determine which stocks (and/or features thereof) are similar in terms of the probability of their movement patterns to be accurately anticipated by those experts (and those who may be metrically similar to them in being predictively likely to also be able to provide advice regarding stocks as well). This description further suggests that these individuals may also post advice and other information explaining their individual analysis and rationale relating to the stocks and/or supporting their actions or predictions. It is also reasonable that particularly because much of this information may be based upon recent news and events surrounding the stock, one could apply the above suggested general NLP approach to finding correlations with subsequent stock movement patterns (extracting these correlations may be more efficient if the same individuals posting are analyzed due to inherent similarities in the meanings and significance/impact of descriptive use of their use of language such as words and syntax). It may even be possible to identify groupings of similar writing styles within large enough corpi of sample messages in order to adjust via further customization of templates certain word correlations which are unique to each type of writing style. Very large test samples would however be a key requirement.

Another interesting source of feedback information may be what particular articles (or more particularly text segments) such "experts" tend to access and/or spend time reading as a potential means of establishing additional relevance in the form of weightings of the term attributes found within these stock movement correlations. Some of these investors trading activities may, for example, immediately follow their review of certain articles and the direct response of the investor to have made certain investment decisions in response to certain articles with a resulting successful outcome, (i.e., more successful than the general market's analogous behaviors may be indicative of similar imminent market activity following the release of similar articles in the future even if not directly read by those experts). Of course a strong indicator of initiating real-time trading would occur if such an article(s) were read AND the expert initiates an appropriate active trade(s). One may apply similar techniques to automatically adjudging weighting of feedback for advice which is provided by an expert, as provided via Internet chat (text or voice) or even telephony, i.e., the highest weightings would be provided to advice which an expert provides in response to reading investment related news if the expert also made corresponding investments on his/her behalf (higher weightings may also be statistically proven to be justified if such advice were provided to business associates or friends). In these cases associated immediate trades could be performed if the statistical prediction of success for that investment domain(s) is high enough. In this regard, certain types of advice may further be weighted in accordance with the historical behavior of the market with respect to that advice. In this case, the associated relevant actions of the expert (e.g., making a direct personal investment on that advice, the quantity of such an investment and/or advice given to colleagues, friends, etc.) can become additional useful attributes in predicting the quality of the predictions (i.e., probability and magnitude of the prediction with respect to the market). Of course, these market predictions regarding advice of experts need not be limited to the context of their appearance in response to news releases exclusively. And long-term predictions may of course, be considered in accordance with the short-term trading model accordingly.

In a very similar extension one may view "experts" as advisors who are publishing their advice, e.g., columnists who are market analysts or analysts of analyst advice. The following technique may be useful for enhancing general relevance feedback, but is particularly intriguing for applying to experts with regards to stocks they are expert in. More finely granular relevance feedback may be achieved through automatically observing visually, e.g., vis a vie the user's computer camera. The particular text segments and even words observed by the expert and the associated moment by moment degree of corresponding "excitement" or "sympathetic response" by dynamically measuring the degree of pupillary dilation and the degree of change thereof. Like other forms of relevance feedback, these measurements may be normalized across a large number of users by determining the relative comparative values across a number of different sites and adjusting the interpretation of the degree of response towards a value which is appropriate to the relative degree of response for that site in particular. This technique can be applied to measurements of absolute value and degree of change in response to an identifiable target object (in this context also sentence or even associated keyword). This general approach to relevance feedback in general was suggested in U.S. Pat. No. 5,754,939, "System for Generation of User Profiles for a System for Customized Electronic Identification of Desirable Objects". The present method may provide further insight into the nature and particular degree of the anticipated stock movement pattern. Such articles, which are metrically similar for the very reason of the predictive value of their content, would accordingly be of considerable value to experts who may be hand-crafting trading rules (as will be described further below) as well as, of course, users who wish to make manual trading decisions based upon new releases which are particularly relevant to the most opportune real time tracking conditions (as in a fully non-automated manual version of the present system). For example, users who are automatically notified of a condition, e.g., information and/or behavioral actions and/or advice of experts in which such condition reaches a predictive threshold of a particular market change. In this case, that individual may be automatically notified and appraised of variable(s) constituting that condition.

In a further elaboration of this concept, it is even conceivable that one could perhaps pick up certain additional "hidden meanings" or higher level conceptual elements in the opinion or analysis which may not have been properly detected by the system, not clearly conveyed by the human expert (or perhaps conceptualized in response without being conveyed at all). As such one may thus further attempt to cluster templates from a response of these experts in combination with templates which come (and are characterized as such) from an article(s) recently read by the expert just prior to releasing the associated responses. The present approach could, of course, be further extended to professional "experts" (i.e. stock analysts).

The present methodology could also be extended to press releases as well as more general information as it is posted on corporate web sites. Again, as suggested above, the behavior of "investment experts" may be usefully leveraged and the possibility exists that other types of individual's behavior (e.g., corporate "insiders") may portend certain significant market perceptions and associated changes relating to that company as manifested through documentation and correspondences. Indeed documentation, correspondences and trading behavior of such individuals may be both implicitly predictive for the present automatic triggering of trading actions and may contain valuable insights which could enable humans knowledgeable in markets and investing to devise hand-crafted customized rules to "trigger" such actions (described below).

One could also look at such relationships as the total number of the general public which represent the typical investor within that investment sector of stock to read a given article, visit the corporate site of certain relevant pages thereon, the percentage of those which subsequently (or immediately) search the Web (e.g., present key words which relate to that company or event), read additional articles or visit that company's corporate Web site. One could also provide a similar analysis for "experts" or insiders (although the model would likely need to accommodate the fact that typical investor behavior patterns tend to correlate with more immediate market changes while "experts'" or "insiders" behavior may even pre-anticipate movements resulting from correlations with typical investor behavior to the extent that general perception modifying events can themselves be better anticipated through the use of their knowledge, e.g., more prespicious knowledge and/or access to additional useful information sources). In other cases, it is likely that knowledgeable individuals are likely to anticipate longer term positive or negative trends better than the typical investor which could be factored into the overall automated trading decision model. This is typically also true if these "insiders" are privy to certain information before it is picked up by the press and are able, through their behavior, to manifest discemably significant clues, through their behavior, which anticipates a news article contributing significant information. Whether and to what extent informationally privy individuals pre-anticipate short term vs. long-term market behavior compared to the general investor community (and to what extent) is a matter of further investigation using real data. It is, however, reasonable to expect that for the most part, the value of knowledgeable experts is likely to provide advantages for long term trading decisions.

The model should be designed within its short-term trading model to account for such long-term factors (such as that suggested or actions, clues and advice picked up from internally proven investment specific domain experts) i.e., both long and short term price predictions (relating to the present release and all other relevant, past and present inputs) should be considered in a short term trading strategy, though the relative influence of the long term effects in this regard are likely to be small for any given trade but could become significant over time. At this point it is perhaps worth suggesting leveraging the value of the reactions of these individuals whose behaviors are deemed to be of predictive value.

For example the time spent looking at a new announcement (in absolute and particularly relative measurements) as well as any other data which could be captured, e.g., associated verbal, facial or gestural responses, pupillary dilation, correspondences made, content of pages read on-line, etc., immediately following the release, etc. ("emotional" response clues of the users) are particularly likely to be more significant factors for the "average" investor population as its perception of the release is the prevailing influence of the market's short-term fluctuations. Emotional response of a true investment expert may also likely be a better predictor of long-term activity. Of course, such predictive correlations could be extrapolated at the level of individuals relative to individual investments and (given sufficient historical data) even become particular to that individual's specific behavior or overall "user profile", e.g., content profiles accessed, pages hit, communications (of various formats and contents) conducted, including some behavioral features, which correlate with other important variables such as investment news tracking, including pages read about details of industry, sites within a particular investment domain (including associated underlying technology), The domain expert's inferred intelligence, intuitive capacity, or business sense, prudence in making "wise" buying decisions (in the investment domain or in general) as well as more purely emotionally indicative signs (such as papillary dilation and other measurable behaviors associated with the reading of the specific piece of key content), etc. More sophisticated analyses are possible.

The order of announcements may be significant, as well as their timing. For example, a stock swing two days after an announcement might be the result of the announcement, but that is less likely if another announcement intervened. Other combinations can be considered (e.g., layoffs can be interpreted differently depending on the company's financial health), but given the sparsity of the data (in spite of the vast quantities available), care must be taken not to over-fit (i.e., to fit models to random fluctuations). Standard statistical methods of significance testing are useful here.

Consider the XYZ Corp example with templates above and stock prices below.

XYZ Corp

| time | stock price |
| --- | --- |
| 10:12 | 14¼ |
| 10:11 | 14 |
| 10:12 | 14¼ |
| 10:13 | 14¼ |
| 10:14 | 14¼ |
| 10:15 | 14 |
| 10:16 | 13¾ |
| 10:17 | 14 |
| 10:18 | 14 |

One could in theory take each template instance and count how often the stock price went up vs. how often it went down. This provides an estimate of the probability of the stock going up or down the next time the template is seen. Unfortunately, a given template instance will rarely appear. (XYZ won't often announce a 15% decrease in profits.) One must, of course, appropriately generalize across template instances. E.g., check to see how much, on the average, stock prices decrease when any company (not just XYZ) announces a 15% decrease in profits. The matter is complicated because one wishes to also generalize to different amounts of decrease (e.g. a 10% decrease). It also might be the case that such announcements have different effects in different industries.

Thus, it is useful to have a taxonomy of what companies are in what industries (e.g., by high level SIC codes) and to calculate statistics for templates grouped by industry. It may also be is reasonable to assume that some of the announcements known to affect a given company similar to another company (e.g. IBM) will affect IBM while others affecting other similar companies will also affect IBM, e.g., large computer company (of approximate size) correlated to expansion of global operations resulting from investments to introduce and expand in new Internet companies or (for example) a hardware company correlated to expansion of global expanding investments in manufacturing operations in the third world. Regarding the taxonomy (of determining which companies are in which industries and to calculate statistics for templates grouped by industry), more precisely, the preferred method is to use Stein shrinkage to produce a weighted average:

p(increase of XYZ for template A) is estimated by $c_1$ p(increase of XYZ for template A) observed+

$c_2$ p(increase of all firms in XYZ's industry for template A) observed+

$c_3$ p(increase of all firms for template A) observed where $c_1$, $c_2$ and $c_3$ are constants that sum to one, template A is something like:

COMPANY:—
ITEM: profit
RELATIVE_CHANGE: −15% and the "p(increase for firms in set S for template A) observed" is the fraction of time the stock price increased after template A was observed, averaged over all companies in the set S being considered.

More generally, one can predict not just the direction of change, but also its magnitude. To do this requires finding templates which represent similar situations. For example, the inventors define a metric measuring distance between different templates (e.g. a 15% decrease in profit is close to a 10% decrease in profit, but unrelated to a 15% decrease in number of employees). For templates with small numbers of attributes, a standard Euclidean metric works well:

$$\text{distance between template 1 and template 2} = \text{sqrt}(w_1 (\text{profit\_change\_1} - \text{profit\_change\_2})\hat{\ }2 + w_2 (\text{company\_size\_1} - \text{company\_size\_2})2 + \ldots)$$

If there are very large numbers of attributes then a cosine metric is more effective.

Once a metric has been established, templates can be clustered together into groups using e.g. a k-means clustering algorithm. Groups can then be automatically examined to see which ones have predictive power.

The above sequence of actions is summarized in FIG. 2.

Given sufficiently large statistics, it may also be useful to include as part of the clusters' associative attributes representing the individual company identities, thus the accuracy of the model may be further improved by determining what kinds of announcements tend to correlate with which stocks and from this data predict with greater precision which other announcements are likely to apply (or not apply) between different companies and to what degree.

The estimated probabilities of stock price increase or decrease are used to construct a trading strategy. A simple strategy is to simply buy stocks that are predicted to increase and sell (or short) stocks that are expected to decrease. This is reasonable if the movements are expected to be rapid, as described above. In practice, the decision to make a trade is determined by using the estimated probability of the stock (say) increasing, the magnitude of the increase, and the uncertainty of that prediction with the transaction costs and exposure risk. This will be obvious to anyone with a background in finance.

The above sequence of actions is summarized in FIG. 3.

If the above method is used on longer term changes (e.g. using newspaper stories to predict stock price changes over days or weeks), then it is best to learn to predict how each stock will change relative to the market and, similarly, to hedge against possible market changes by simultaneously buying the stock and shorting the general market (or better, the specific industry the stock is in). Owning a stock but shorting a proportional amount of the market (scaled by the relative volatilities as measured by the beta) will, as is well known, reduce exposure to general market fluctuations.

This idea can be extended to making bets on implicational statements: now that I've seen this announcement about Nabisco buying De Beers Diamond Company, I predict that if the price of gold tanks then Nabisco's stock will go down." Or, "I predict that if this stock price falls by more than $3 then it will climb on the following day." As mentioned above, care must be taken in searching for such correlations, since given the enormous number of possible correlations one might find, it is easy to locate spurious correlations. Again, complexity penalization methods (which increase the threshold for believing a proposed correlation based on how many correlations are examined) or cross-validation techniques (which check whether a correlation found in one time period also holds over other time periods) are needed to avoid overfitting. Of course if an implicational statement is also supported by a human e.g., a proven successful investor, is in a particular cluster(s) of stock, e.g., an on-line posting (or other communication) this may add to its validity. Implicational statements and other complex rules may be automatically extrapolated from these natural language communications of these experts using techniques of statistical NLP and/or customized templating techniques.

As indicated above, of course, these correlations may suggest short-term changes or long-term changes in price. It is perhaps worth mentioning the possible effect upon market perception at multiple correlations. For example, one must be somewhat aware of how market perception may react to multiple simultaneous effects. E.g. the release of a new advance home entertainment and video/audio recording system by Microsoft may be somewhat eclipsed by news concerning the company's government enforced breakup or (for example), if during the period of the Microsoft break-up other news is released about Microsoft being suspected of flagrant violations and abuses of consumer privacy. This could result in a compounding negative effect in the predicted correlation of that news release with the price of Microsoft stock. Or for less dramatic news releases, e.g. the release of three closely timed news articles each containing additional new information regarding a revolutionary new technology associated with a hot Internet start-up all of which is of a positive nature, the degree of impact upon stock price of each subsequent article (following the first) may be diminished by the recent release of the previous article(s). This effect may be due primarily to the justifiable) belief of the market that each subsequent positive event (among multiple positive events) may each have a positive albeit diminishingly positive effect upon total value of the company's stock. Of course, the significance (degree) of the positive news may be important. In each above case, volatility may also be an important factor to consider.

Also the timing (period between each announced event) should be considered as well as whether a particular announcement was made in another (or other) publication(s) and if so what was the readership of other publications carrying the release. Also, was the announcement a headline presented in a back section? What was its estimated on-line distribution?

Conversely, there may be factors which would likely have significant effects upon a stock. However, the actual surrounding events may be uncertain. Also, the market's awareness of the possibility of such an event may impact the price of that stock very substantially either positively or (particularly) negatively, depending upon the volatility of the stock (e.g., the impact that the event would have upon the stock may be largely determined by how large or diversified if the event is relevant specifically to a particular division). If the potential impact of the event is significant, the company (particularly if negative) and the market perceives the associated likelihood to be significant the effects on price may be almost as significant as if the event occurred. If no resolution occurs for an extended period of time (e.g., a criminal allegation against the company) the stock's value may remain unfluctuated. If it resolves quickly and does not come to pass, the rebound effect may also be very significant. The main point in these examples is that when predicting stock price resulting from a news release the primary factor to be considered is the market's perception (as gauged by the market's response to prior news releases which relate to the present release) compared to expected market response to the present new release independently (again with the caveat that one that one must factor in the effect that multiple releases on the subject may have given the present specific circumstances of the release and the context of the companies' overall surrounding circumstances).

Overall the presence of multiple correlations which may be affecting a given stock simultaneously which may be positive and/or negative may itself add an additional level of complexity for analysis and correlation; however, this problem is likely to be somewhat tricky. For this reason it is definitely preferable if historical statistics (such as the most exemplary cases in which market behavior did follow these complex patterns (and preferably the exemplary cases in which it did not) and allow the human to apply subjective judgment to validate the correlation on a case by case basis (or modify it or create a novel one accordingly). For example, in the above case, perhaps the price of gold has gone down for a very specific reason (relevant articles for which can be automatically retrieved for the user) and is expected to rebound, the diamond division is small compared to the rest of the company, and its relative percentage sale of gold-containing products is very small, a recent announcement suggests that profits in the main division or another division are escalating or that a major set-back has occurred to sales of Nabisco's largest competitor.

Other variables may conceivably influence certain correlations such as economic variables, which may have more macro-level effects upon certain stocks, the price of commodities within certain industries which may be indirectly influenced at least perceptually, etc. (although news regarding the present economic stability may indirectly affect other variables such as the overall market and volatility by influencing level of risk taking investors and sensitivity to market or investment specific down turns.

For certain stocks (e.g., particularly in rapidly changing or high growth markets like technology stocks), competing companies may be affected inversely by positive or negative news about their competitors than they are to an indirect rebound from investor speculation.

Given the efficiency of the market, the inventors do not expect the above suggested methods of complexity penalization techniques or cross validation techniques (to avoid overfitting) to produce superior returns for longer term price prediction. The same method can, however, be used to predict changes in the volatility (or variance) of stock prices. The method works exactly the same, except that instead of using price as the variable to be predicted one used a local (e.g. daily) volatility. One then buys and sells volatility (or, more precisely, derivatives which serve a proxies for volatility), rather than trading on price.

There are also instances in which the primary objective is to identify (immediately upon announcement) certain particular events for which custom templates can be constructed and for which the significance of such event (and thus anticipated effect on overall price) can be estimated by a human vis-a-vie a customized manually constructed trading rule which is triggered if/when a particular event actually happens. For example, the formal announcement of the Justice Department's decision to breakup Microsoft or the announcement of the outcome of the bidding war between AT &T and Comcast to purchase Media One; e.g., involving a pre-ascribed rule which could trade a significant amount of Comcast for AT &T stock if/when AT &T won the bidding war or vice versa, if Comcast becomes the eventual victor. Of course, a human may be notified if the bidding war is further complicated or settled by the unexpected announcement of a third company. The information contained in such announcements could even be reasonably complex. For example, case-based techniques a particular method of statistical NLP often used to determine if a particular sample text (effectively a query) is in fact very similar (or not) to another piece of text (the newly released announcement). In the use of this method the sample (query) text is stated very simply and plainly and ideally different ways of stating the prospective event are presented. E.g., Comcast loses (or AT &T wins) the bidding war for Media One or Media One is acquired by AT &T. These case based methods could be also useful in enabling a human expert constructing the trading rule (which is influenced largely by the nature and degree of the effect of the prospective event upon one or more of the companies involved), to identify other at least somewhat similar situations and events in previous announcements from which the human expert may analyze and assess particularly the immediate effects upon price of the companies involved and with this historical data perhaps better construct trading rules which are appropriate with the effects on price of the relevant companies. Because such announced events are so subjective in nature particularly within such a dynamic market, it is unlikely that construction of such trading rules could be fully automated with reasonable predictive accuracy based upon this historical data without the intervening assistance of a human in the loop. It is possible that in such case-based methods, the statistical confidence that a present announcement, in fact, shares the same meaning as a sample (query) text provided by the expert falls below a reasonable (desirable) confidence threshold. In such cases a human may possibly be automatically and immediately contacted in order to confirm the similarity in the meaning of such announcement and/or if it is, in fact, slightly different in another instance automatically determined likely to be a very important announcement, e.g., contains certain pre-determined stop words/phrases such as "Microsoft acquires", etc., it may be desirable for the human expert to be contacted in order to refine or modify the trading rule based upon his/her direct analysis. In those instances, in which it is in the company's best interest to provide no advanced indication or warning of a certain event to the press, (which does occur on a reasonably frequent basis) as well as for first time announcements of proposed or likely future events, the present technique could be quite useful. In fact, human experts and market analysts could even construct a plethora of different (albeit reasonable, at least remotely possible) potential future event scenarios and for each one, ascribe a trading rule which is appropriate with their estimated stock price effects upon the associated relevant companies. This plethora of scenarios, may for example, consist of very remote possibilities, however, if/when they were to occur, the effects upon stock price could be very significant. For example, "Intel Corporation acquires GE" or X corporation acquires GE (where X corporation's preexisting stock value relative to that of GE could be one of the relationships upon which the trading rule is based, "Microsoft Corporation declares bankruptcy for reorganization in wake of lost profits due to Justice Department break-up", or "Windows 2001 contains a virus which results in n range of negative likely scenarios each with an associated "negative impact" and associated price rule.

Two important benefits which a human in the loop can provide are:

1. In determining whether the present announcement which the system identifies as being relevant to the trading rule is in fact appropriate to it (i.e., employing human interpretation to establish or confirm the relevance of the trading rule to the announcement such as identifying any caveats or complicating factors suggested in the announcements which could reasonably affect the prudence of triggering the trading action). If the statistical confidence for such a trading action is very high, typically, however, it is significantly more important to pre-empt the market's (only slightly) slower response to the announcement than apply human reasoning to interpret and disambiguate more subtle aspects of the associated meaning and risk losing this time edge on the market. Determination of this threshold can be performed statistically; however, it also depends upon how quickly the human responds to the relevant notification. One approach could be to determine the time threshold after which incorporating a human response element is typically not worth the impact of the delay upon anticipating the market's response (e.g., based upon the marginal value that a human ultimately adds to the same trades had they been fully automated and perhaps the degree of market change compared to anticipated ultimate change which may already be beginning to occur at that time and attempt to urgently notify the user indicating the time) threshold at which the advantages of the human intervention become outweighed by the time consequences (at which time presumably the automated trade action would occur). By the same token, the degree of urgency of the notification to the human could be proportional to:

a. The significance of the announcement (i.e. suggesting that if the trade is in fact as prudent as it appears a significantly larger trade could be made if confirmed by a human).

b. The degree of "uncertainty" in the system's understanding of the announcement, ie., that it in fact means the same as the conditions of the trading rule and/or the probability of the existence of other caveats in the announcement which may require further interpretation of a human (e.g. "Microsoft resolves antitrust case with U.S. government," which is a positive influencing factor and a match for a trading rule); however" penalties include "Windows operating system can only be used on certain hardware platforms".

Because of the deficiencies in capturing the conceptual meaning of natural language outside of the scope of specific example scenarios (using case based matching techniques), as well as statistical deficiencies in adequate historical data to predict the market response to the particular news event scenarios, the measure of this degree of uncertainty may often be difficult to accurately determine. Thus, more general estimates may need to be automatically arrived at in many cases.

2. In constructing a rule (or approving one which has been automatically suggested) using data analysis tools which can be used to analyze and correlate statistics of textual information in accordance with at the market's responses. I.e., there are likely to be on the surface of an announcement the very subtle factors (some interrelated) which may be complex and unique to the present context and thus not readily detectable by statistics alone (for use in a fully automatic analysis and trading system). Some of these factors may actually be even stated in the announcement, and may be available in previous news releases, or combination thereof. All of this data should be included into the statistical model and (as above suggested) complexity penalization techniques may be incorporated For example, as to the case cited above in which similar announcements previously affecting IBM in the past are likely to also affect companies like IBM (based upon a company "taxonomy"), it is possible that such factors as the company's overall financial health, the market's valuation (in that sector or relatively speaking for that stock), other recent news (which could for example be significantly negative so as to eclipse market perception or the positive effects of expanding global manufacturing operations). The surrounding context of the announcement may also be significantly important, e.g., did the company in the SAME release also announce that substantial losses are predicted due to a failure to previously launch a substantial overseas hardware development initiative compared to the aggressive strategies of competitors? Did the previous "similar" situations occur in approximately the same time period as that of the present announcements? Cross-validation techniques may accordingly confirm the relevance of the underlying correlation in view of potential effects on the validity of the correlation due to time).

Below described is a suggested technique to identify through user specific analysis of behavioral actions and associated user profiles, identification of specific variables in certain users which are "telling" of overall market trends. These variables may be based upon a user profile specific basis and (or specific actions which are associated with training decisions which are exemplary of the overall dynamics of the market at an investment specific level). As suggested, it is also important to consider all perception influencing factors as well including such factors as whether the intervening factor was part of the same article, part of the same publication (as well as relative degree of prominence in that same publication compared to the primary relevant announcement), the textual style such as over sophistication or clarity to extent that it affects comprehension or interpretation of significance to the average of the market audience, etc.

Because of such complexities in the surrounding context it may be most desirable to empower humans with the proper tools to be able to analyze all relevant information and history relating to the surrounding context of the announcement and company as well as (most critically) the market's statistical correlations relating to similar situations to the announcement.

These tools may also mine correlations in stock movement patterns in response to comments, advice or observations made by knowledgeable experts regarding a particular stock or group of stocks. It is important in many cases to perform this analysis and perform the appropriate trades very quickly after the content is provided. However, it may not be the case if it is provided in response to a type of announcement which may potentially possess deeper implications which only a knowledgeable expert would be able to extrapolate, such as the acquisition of another company (which may hold some key IP, know-how or personnel within that industry sector) or which is relevant to the future technology direction of the company or losses of some key people or sale of a division which had previously been instrumental in promoting a new technology initiative for the company, which some believe may be strategic to the company, e.g., capturing the "window" of time between when an announcement is made and when analysts themselves physically state their interpretations of announcements containing these similar insights. There may even be a few cases in which a knowledgeable expert may, based upon certain available facts, predict well ahead of the market the likely possibility of a forthcoming event, which has significant impact upon stock value. In this case, if this possible eventuality has distinctly negative implications on price, it may be worth shorting the stock in advance and im anticipation of the possible eventuality or if its implications are positive, a purchase of options may be worthwhile (in lieu of gambling on the actual outcome) and/or, in this case, the expert may introduce a trading rule which anticipates this eventuality (or other possible alternative scenarios). On the other hand, knowledgeable domain experts may state hypothetically such as if X,Y,Z occurs then Stock A will be a good buy for the following reasons. This information, in turn, could be used to write a custom rule to anticipate a potential opportunity such that an immediate trade could be triggered upon such announcement. This rationale as provided (as well as considering the identity of the provided of the argument) may itself contain useful predictive indicators as to the predicted degree of soundness of the rationale.

It is worth analyzing also the ideal timing for performing a trade in response to an announcement. There is, for example, often a "wait and see" element in some investor's behavior in which an anticipated action is triggered by a subsequent or more detailed announcement, e.g., coming out in print following an initial announcement on radio or TV (or the Internet), or investors may simply respond more quickly to certain types of announcements and perhaps investment sectors than others. The aforementioned attributes relating to "emotional response" particularly that of the "average" investor and their correlations relating to the announcement may provide some predictive clues as to whether, under what conditions (and possibly to what degree) actionable behavior by the market will follow and when relative to that stock.

One trigger could actually be the initialization of a price fluctuation wherein a price fluctuation is predicted, however, the timing of the fluctuation is difficult to predict. This approach may also provide a means to optimize the timing of trades in general. It is however important to not exceed a threshold of risk of performing the trade, which could be estimated statistically only after the fluctuation has substantially occurred.

In any event, it is quite important to provide the human developing the rules to be presented with all of the surrounding and historical data (and times of release) and market statistics, which relate (via content matching techniques) to the announcement. Statistical models usefully incorporate some human intuition in refining the models which take into consideration some of the more typical kinds of caveats, exceptions and context influencing factors which may prove to most significantly skew correlations based exclusively on statistical models developed without human input. This approach would be useful in this preferred case of humans constructing (or approving) the particular rules or in the case where they are generated automatically.

A couple of other inputs, which are perhaps worth mentioning, are:

1. The activities of companies' marketing efforts and/or sales thereof as extrapolated from either news releases or from capturing advertising data relating thereto from the Internet (Web-page advertising, e-mail advertising), radio and TV (electronic media commercials) e.g., using speech-to-text techniques to extract text or closed-captioning (for TV).

2. Product or services reviews, e.g., from such services as consumer reports or customer driven quality ratings such as Open Ratings.

3. Price of products or services (as publicized from news, on-line brochures/Web sites). The variables of quality and pricing may be important if correlated together (as they may be a determinator of value provided to the customer).

In light of the recent rise in popularity of day trading, certainly a legitimate and reasonable business model to commercializing the present system would be the sale of day trading software to the consumer market (based upon a straight sale or revenue sharing approach). One reason that this approach is particularly compelling from the commercialization perspective is that if used in a brokerage usage context, once word gets out as to the methods used (e.g., through publication of a patent) and once the approach becomes adopted widely by other brokers which emulate the present methods, the market will adjust itself and the effects of trend anticipation will be reduced. On the other hand even if this occurs there will always be a market to improve the efficiency of day trading software in light of the associated high value potential of consumer software.

Additional Applications

1. Incorporating User Profiling into the Predictive Models

In issued U.S. Pat. No. 5,754,939, "System for Generation of User Profiles for a System for Customized Electronic Identification of Desirable Objects", techniques are disclosed by which user profiles are automatically generated based upon a comprehensive automated analysis of user behavior interacting with (on-line and off-line) media such as the Internet. There may be certain ways in which users profiled according to preferences degree of investor success, as on-line investors and/or consumers of certain types of investment related news may be statistically identified as being "exemplary" users whose investment related activity exemplifies over-all market behavior with regards to certain stocks and even particular market phenomena which is statistically identifiable regarding certain market fluctuations (in general) and/or their associated responses to particular stimuli such as news/informational stimuli or initial movements which are catalysts to a fluctuation or trend. These individuals could perhaps even possess certain seemingly unrelated attributes perhaps psycho-graphic demographics (including geographic region) or other content attributes which indirectly correlate with certain market exemplary behavior characteristics based upon (e.g., similarities in perceptual interpretative similarities and/or behavioral response patterns). The key point of this idea is that once these individuals are clearly identified, close monitoring of their behavior (at a sufficient level of statistical confidence) may be an indicator of larger scale market fluctuations. Identifying those individuals in particular whose behavioral response tends to pre-empt the corresponding general market movement as much as possible is, of course, most valuable. Some of these fluctuations may be, of course, in response to newly released information, e.g., they are domain "experts" or perhaps they have a proven track record for certain types of announcements (perhaps in combination with the specific type of stock) of displaying very similar trading patterns to that of the market based upon the present context of variables. Once analysis is performed as to the particular types of news (or other informational) releases tends to elicit which types of fluctuations for an investment or category thereof, it is conceivable that in a novel extension of this approach, these exemplary individuals upon their individual consent could be delivered certain hypothetical news releases which fall within the general grouping of representative types of releases which tend to elicit fluctuations, however, suggest certain potentially likely future events which have, in fact, not yet occurred. In one variation, these users are surveyed to describe in detail what kinds of trading activities they would perform following such news release.

In a most preferred variation, users are unaware of the difference between the hypothetical and actual news release and perform their trading activities accordingly. (The releases may be e-mail or Web based). Of course, some of these market responses may not only affect an individual company but, depending on the type of release, may also affect a cluster of "similar companies" or commercial sector of companies. It is, of course, optimal in this case to mimic the delivery of the editorial style and positioning within the electronic news site and in every way mimic the exact course, position, format/style, etc., to what could be most likely anticipated in the event of an actual release of that information.

In a potentially interesting variation, it would be possible to analyze a plethora of "most likely" potential scenarios of news events. It may be possible to determine statistically the particular scenarios for which the system could anticipate the market response with the least amount of statistical confidence. Also considering the relative probability of these scenarios, it may be possible to further determine, through the use of a decision tree, those particular announcements, which are the most "telling" of the most probabilistically likely yet least statistically confidence event scenarios and present these automatically selected revealing exemplars to the subset of market constituents whose profiles and behavioral patterns are predicted to be most exemplary of the market's response to those particular hypothetical exemplary event scenarios. The statistical confidence in these sparse data areas of the multidimensional space are improved. In additional (like the technique of rapid profiling as described in U.S. Pat. No. 5,754,939, entitled System for Generation of Object Profiles for a System for Customized Electronic Identification of Desirable Objects") the selection of the exemplars may dynamically change in accordance to the market's response (i.e., present statistical confidence) resulting from the previous exemplars as presented.

3. Investment Advice Barter Exchange

Because the market by nature discourages the sharing of truly valuable advice (by diluting the effects of future trends of the market which are presently substantially concealed from the market as a whole), investors who have good advice to give are likely not to share that advice unless it is to other investors who are likely to have equally good advice to provide in return, as well. Because most investors who have a truly proven track record of preempting market trends demonstrate this advantage within very specific domains and sub-domains of investments, there may be significant opportunity for different "classes" of investors to be established upon their proven degree of success in investing. Based upon their degree of success they can then join a particular class of investor and benefit from the sharing of advice which is demonstrated to be of similar value to that which they are able themselves to provide. The caveat is to insure that sufficient advice is provided to approximately match the amount of advice consumed and that deliberately misleading advice is not provided. For example, to be sure the advice they provide corresponds to the type of investment activity, which they themselves engage. Certainly their investment activity can be a very useful form of "advice". In one variation, these advisors either maintain their class privileges by providing a minimal amount of advice which is later proven to be valuable or actual barter points could be credit and debit based upon the amount of valuable amount of advice provided and consumed respectively. Of course, bad advice would also be penalized in some fashion. In addition to the use of this general approach to facilitate the sharing of advice from a broad variety of domain experts, it could also provide an "open forum" for domain specific experts to be able to express and debate their opinions, as well as exchange information so as to refine the value of their own advice as well as provide a more informationally rich forum for the consumers of that advice. The generally preferred method for predicting regarding which investments is likely to result in which degree of success for a given individual (or conversely which individual's advice is likely to have the highest likelihood of success for a given investment) may be determined by clustering the companies and their associated attributes (as predicted metrics of the companies for which certain types of investor's advice has a demonstrated history of success). This technique is explained in detail in issued U.S. Pat. No. 6,029,195, "System for Customized Electronic Identification of Desirable Objects".

4. A Market for Useful Advice

Another approach for rewarding and incentivizing users, who are predicted to be able to provide valuable advice for particular investments, could be achieved by compensating the advisors for their advice. This could be achieved by a simple sale of the advice based upon a market model in which the statistics of past success of the investor's advice and investment behavior is known and considered as well as (generally, for the benefits of the consumers of the advice) the predicted confidence (risk) of the advice given the context of the advisor and type of investment(s) and relative predicted degree of success (based on his/her history) and investment return if the advice from that advisor is in fact correct. Accordingly, potential consumers of that advice may bid on access to that advice.

There are potential conditions to the sale of the data, which may be applied, which are designed to maximize overall profit to the advisor. For example, a statistical model could be developed (based upon various scenarios) in which varying degrees of dissemination of advice to other users is provided, and the associated reduction in market value is determined (estimated as accurately as possible) as a result of the dissemination of that advice. This impact is, of course, going to have at least some effect upon the value of future similar advice. As such the idea is to determine the optimal threshold of the number of users for which advice can be sold such that there is a viable established market for that advice and the associated price for that advice to the market is optimized. This value is likely to be relatively similar irrespective of the particular circumstance with the exception of the fact that the market may possibly "perceive" the value of the advice to be greater (or less) than it actually is, statistically speaking (e.g., the stock tends to be a bit unpredictable. For example, there have been a few isolated wild successes in the advisor's history). In addition this optimization varies according to the amount of personally invested funds which the advisor has made in his/her own advice.

The terms of the associated buyer-seller transaction may be either based upon a direct sale, a percentage of the resulting increase in valuation and/or percentage of the investment made by the consumer of the advice. The second means of compensation would likely, of course, provide the greatest incentive to the advisor to provide valuable advice.

The invention claimed is:

1. A method of predicting stock market behavior using trading software having a data analysis tool implementing natural language processing and a stock predictor implementing a stock prediction model, said trading software being executed by a processor so as to cause said processor to implement the steps of:
    said processor extracting information from news media relating to a particular publicly traded company using said natural language processing to parse or pattern match on words in said news media to identify natural language text describing activities or announcements of said particular publicly traded company that is in or near sentences containing a name of said particular publicly traded company and to automatically fill templates with said natural language text;
    said processor using a clustering algorithm to cluster at least some of said templates into groups that are statistically correlated with changes in stock price of said particular publicly traded company;
    determining a statistical significance of said changes in stock price of said particular publicly traded company based on information in said clustered templates; and
    predicting changes in price of the stock of said particular publicly traded company based on new information about said particular publicly traded company if information of the type included in the new information has in the past caused a statistically significant change in the stock price in said particular publicly traded company.

2. A method as in claim 1, said processor further using said clustering algorithm to cluster templates containing the extracted information of said particular publicly traded company with templates containing extracted information of another company whose stock price has been shown to be similarly affected by information of the type included in said new information.

3. A method as in claim 1, said processor further standardizing different references to the particular publicly traded company by different proper names, co-referencing when the particular publicly traded company is referred to by a pronoun, adding said new information to said template, and adding additional information about said particular publicly traded company to said template using databases and/or derived values.

4. A method as in claim 1, said clustering algorithm further clustering templates containing information about different publicly traded companies into similar cluster groups, and said processor determining changes in stock price at different intervals for different companies in a cluster group in response to comparable information and estimating the statistical probability of a change in the stock price of said particular publicly traded company in response to certain new information statistically correlated to that in said comparable information.

5. A method as in claim 1, comprising the further step of conducting a stock trade based on said predicted changes in stock price.

6. A method as in claim 1, comprising the further steps of weighting textual attributes of said news media and of said natural language processing pattern matching said weighted textual attributes for current and previous news media to provide statistical feedback comparing current news media to previous new media to determine similarities between said current news media and said previous news media.

7. A method as in claim 1, comprising the further step of weighting written advice from market experts in accordance with the historical behavior of the market with respect to that written advice.

* * * * *